United States Patent
Shimizu et al.

(10) Patent No.: US 10,228,298 B2
(45) Date of Patent: *Mar. 12, 2019

(54) TORQUE SENSOR COIL AND TORQUE SENSOR

(71) Applicant: Hitachi Metals, Ltd., Tokyo (JP)

(72) Inventors: Hiroki Shimizu, Hitachi (JP); Teruyuki Nakamura, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,073

(22) Filed: Sep. 1, 2017

(65) Prior Publication Data

US 2018/0067007 A1 Mar. 8, 2018

(30) Foreign Application Priority Data

Sep. 7, 2016 (JP) .................................. 2016-174432

(51) Int. Cl.
*G01L 3/10* (2006.01)

(52) U.S. Cl.
CPC .................................. *G01L 3/102* (2013.01)

(58) Field of Classification Search
CPC ... G01L 3/00; G01L 3/10; G01L 3/102; G01L 5/221
USPC ........................ 73/862.331–862.338, 862.325
See application file for complete search history.

(56) References Cited

U.S. PATENT DOCUMENTS

| 4,538,083 | A  | * | 8/1985  | Nozawa   | H02K 3/04   |
|           |    |   |         |          | 310/198     |
| 6,823,746 | B2 | * | 11/2004 | Viola    | G01L 3/105  |
|           |    |   |         |          | 73/862.335  |
| 9,714,877 | B2 | * | 7/2017  | Nakamura | G01L 3/103  |
| 2017/0284877 | A1 | * | 10/2017 | Nakamura | G01L 3/102 |

FOREIGN PATENT DOCUMENTS

| JP | 2001-021588 A | 1/2001  |
|----|---------------|---------|
| JP | 2003-347117 A | 12/2003 |

* cited by examiner

*Primary Examiner* — Jonathan Dunlap
*Assistant Examiner* — Octavia Hollington
(74) *Attorney, Agent, or Firm* — Roberts Mlotkowski Safran Cole & Calderon P.C.

(57) ABSTRACT

A torque sensor coil includes a non-magnetic bobbin that includes first inclined grooves inclined at a predetermined angle relative to an axial direction and second inclined grooves inclined at the predetermined angle relative to the axial direction in a direction opposite to the first inclined grooves, a first detection coil formed by winding an insulated wire around the bobbin along the first inclined grooves, and a second detection coil formed by winding an insulated wire around the bobbin along the second inclined grooves. The bobbin is divided into plural regions along the circumferential direction, side walls of the first and second inclined grooves in each region are all parallel to a mold draw direction set to be different for each region or are inclined with respect to the parallel direction in such a manner that the first and second inclined grooves are widened toward the outside in a radial direction.

23 Claims, 9 Drawing Sheets

TORQUE SENSOR COIL AND TORQUE SENSOR

The present application is based on Japanese patent application No. 2016-174432 filed on Sep. 7, 2016, the entire contents of which are incorporated herein by reference.

BACKGROUND OF THE INVENTION

1. Field of the Invention

The invention relates to a torque sensor coil and a torque sensor using the torque sensor coil.

2. Description of the Related Art

Magnetostrictive torque sensors are used on a magnetostrictive rotating shaft with magnetic permeability varying according to applied stress, and are configured that variation in magnetic permeability of the rotating shaft when distorted under the applied torque is detected as variation in inductance of a detection coil, thereby detecting torque applied to the rotating shaft.

When torque is applied to the rotating shaft, compressive (or tensile) stress acts in a direction inclined at a predetermined angle (e.g., +45 degrees) relative to an axial direction and tensile (or compressive) stress acts in a direction inclined at a predetermined angle in the opposite direction (e.g., −45 degrees) relative to the axial direction. Therefore, when the torque sensor is configured that variations in magnetic permeability in the directions inclined at, e.g., +45 degrees and −45 degrees relative to the axial direction are respectively detected by two detection coils and a difference in voltage between two ends is measured on the both detection coils by using a bridge circuit, etc., torque applied to the rotating shaft can be detected at high sensitivity.

The detection coils of such magnetostrictive torque sensor are formed by winding insulated wires around a hollow cylindrical bobbin which is formed of a non-magnetic material and is provided coaxially with and at a distance from the rotating shaft. Plural first inclined grooves inclined at +45 degrees relative to the axial direction and plural second inclined grooves inclined at −45 degrees relative to the axial direction are formed on the outer surface of the bobbin. Then, a first detection coil is formed by winding an insulated wire around the bobbin along the first inclined grooves, and a second detection coil is formed by winding another insulated wire around the bobbin along the second inclined grooves. Hereinafter, the bobbin and the detection coils formed by winding the insulated wires around the bobbin are referred to collectively as "a torque sensor coil".

JP-A-2001-021588 and JP-A-2003-347117 may disclose prior arts related to the present invention.

SUMMARY OF THE INVENTION

In manufacturing the prior art torque sensor coil, grooves (including the first and second inclined grooves) for accommodating the wound insulated wires are formed on the bobbin by the cutting process. However, forming the grooves one by one by the cutting process may consume time and energy so that a problem arises in terms of mass productivity.

To improve the mass productivity, it is desirable to manufacture the bobbin by resin molding using a mold. However, the prior art torque sensor coils have grooves of which side walls extend along the radial direction of the bobbin. Due to this, an undercut portion may be caused so as to prevent the extraction of the mold from the molded part.

It is an object of the invention to provide a torque sensor coil that is excellent in mass productivity by using a bobbin to be formed by the resin molding, as well as a torque sensor using the torque sensor coil.

According to an embodiment of the invention, a torque sensor coil used to form a torque sensor that is attached around a magnetostrictive rotating shaft to measure torque applied to the rotating shaft comprises:

a non-magnetic bobbin that is provided coaxially with and at a distance from the rotating shaft, is formed into a hollow cylindrical shape, and comprises a plurality of first inclined grooves and a plurality of second inclined grooves on the outer peripheral surface, the first inclined grooves being inclined at a predetermined angle relative to an axial direction and the second inclined grooves being inclined at the predetermined angle relative to the axial direction in a direction opposite to the first inclined grooves;

a first detection coil formed by winding an insulated wire around the bobbin along the first inclined grooves; and a second detection coil formed by winding an insulated wire around the bobbin along the second inclined grooves, wherein the bobbin is divided into a plurality of regions along the circumferential direction, side walls of the first and second inclined grooves in each region are all parallel to a mold draw direction set to be different for each region or are inclined with respect to the parallel direction in such a manner that the first and second inclined grooves are widened toward the outside in a radial direction.

According to another embodiment of the invention, a torque sensor comprises the torque sensor coil.

Effects of the Invention

According to an embodiment of the invention, a torque sensor coil can be provided that is excellent in mass productivity by using a bobbin to be formed by the resin molding, as well as a torque sensor using the torque sensor coil.

BRIEF DESCRIPTION OF THE DRAWINGS

Next, the present invention will be explained in more detail in conjunction with appended drawings, wherein:

FIGS. 1A and 1B are diagrams illustrating a torque sensor in an embodiment of the present invention, wherein

FIGS. 2A and 2B are diagrams illustrating a bobbin used to form a torque sensor coil, wherein

FIGS. 4A and 4B are schematic exploded plan views showing the bobbin, wherein

FIGS. 6A and 6B are diagrams illustrating a mold used to form the bobbin, wherein

DETAILED DESCRIPTION OF THE PREFERRED EMBODIMENTS

Embodiment

An embodiment of the invention will be described below in conjunction with the appended drawings.

General Configuration of Torque Sensor

Figure 1A:
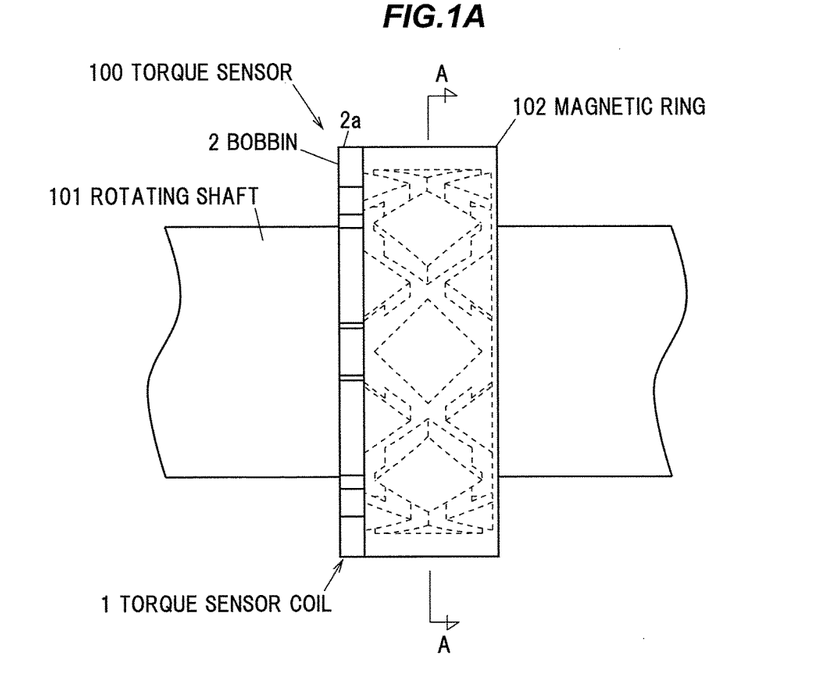
FIG. 1A is a side view when attached to a rotating shaft and FIG. 1B is a cross sectional view taken along a line A-A in FIG. 1A.
Figure 1B:
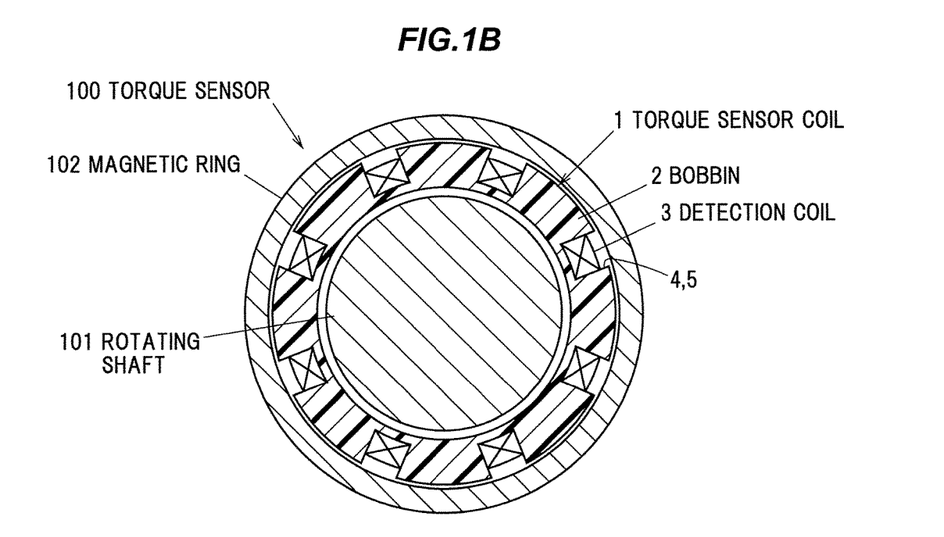

FIGS. 1A and 1B are diagrams illustrating a torque sensor in the present embodiment, wherein FIG. 1A is a side view when attached to a rotating shaft and FIG. 1B is a cross sectional view taken along the line A-A in FIG. 1A.

As shown in FIGS. 1A and 1B, a torque sensor 100 is attached around a magnetostrictive rotating shaft 101 to measure torque (rotational torque) applied to the rotating shaft 101.

The torque sensor 100 is provided with a torque sensor coil 1 in the present embodiment and a magnetic ring 102.

The rotating shaft 101 is formed of a magnetostrictive material and has a columnar shape (bar shape). Examples of the magnetostrictive material include nickel, an iron-aluminum alloy and an iron-cobalt alloy, etc. The material used to form the rotating shaft 101 may be either a positive magnetostrictive material of which magnetic permeability decreases under compression and increases under tension, or a negative magnetostrictive material of which magnetic permeability increases under compression and decreases under tension. The rotating shaft 101 is, e.g., a shaft used to transfer torque in a powertrain system in a vehicle, or a shaft used to transfer torque of engine in a vehicle.

The torque sensor coil 1 has a bobbin 2 formed of a resin which is a non-magnetic material, and plural detection coils 3 formed by winding insulated wires around the bobbin 2. The bobbin 2 is formed into a hollow cylindrical shape and is provided coaxially with and at a distance from the rotating shaft 101. The details of the torque sensor coil 1 will be described later.

The magnetic ring 102 is formed of a magnetic material (ferromagnetic material) and is formed into a hollow cylindrical shape. The torque sensor coil 1 is inserted into the hollow of the magnetic ring 102. The magnetic ring 102 is formed so that an inner diameter thereof is substantially the same as (but slightly larger than) an outer diameter of the bobbin 2 (an outer diameter of a portion on which flanges 2a (described later) are not provided). The magnetic ring 102 serves to prevent a magnetic flux generated by the detection coils 3 of the torque sensor coil 1 from leaking to the outside and thereby to suppress a decrease in sensitivity.

The torque sensor 100 may be further provided with a fixing member for integrally fixing the torque sensor coil 1 and the magnetic ring 102 even though it is not illustrated. The fixing member can be, e.g., a pair of ring-shaped members which are fixed to each other while sandwiching the torque sensor coil 1 and the magnetic ring 102 from both sides in the axial direction, or a molded resin which covers the torque sensor coil 1 and the magnetic ring 102 together.

Description of the Bobbin 2

Figure 2A:
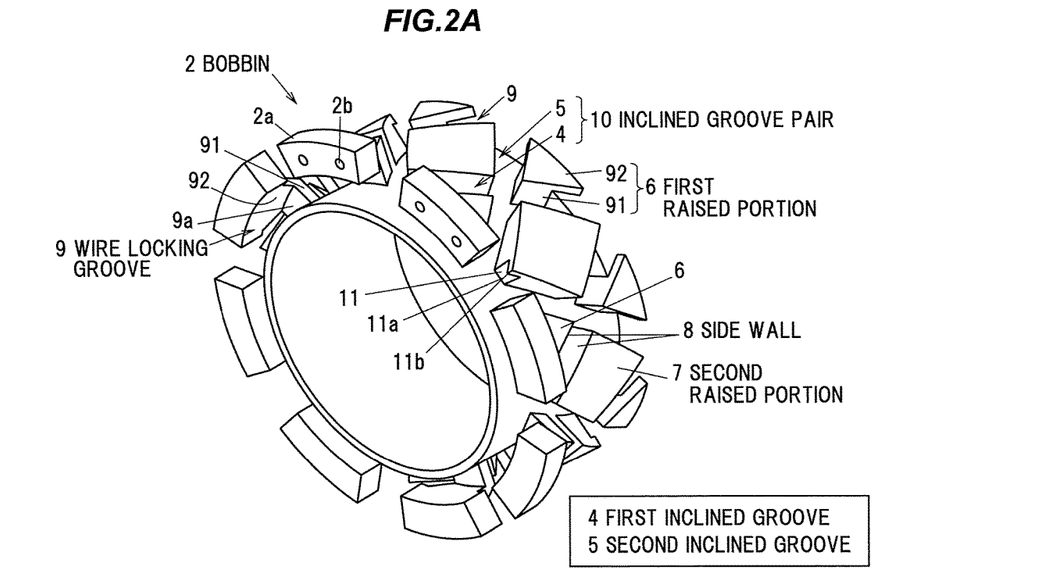
FIG. 2A is a perspective view and FIG. 2B is a front view.
Figure 2B:
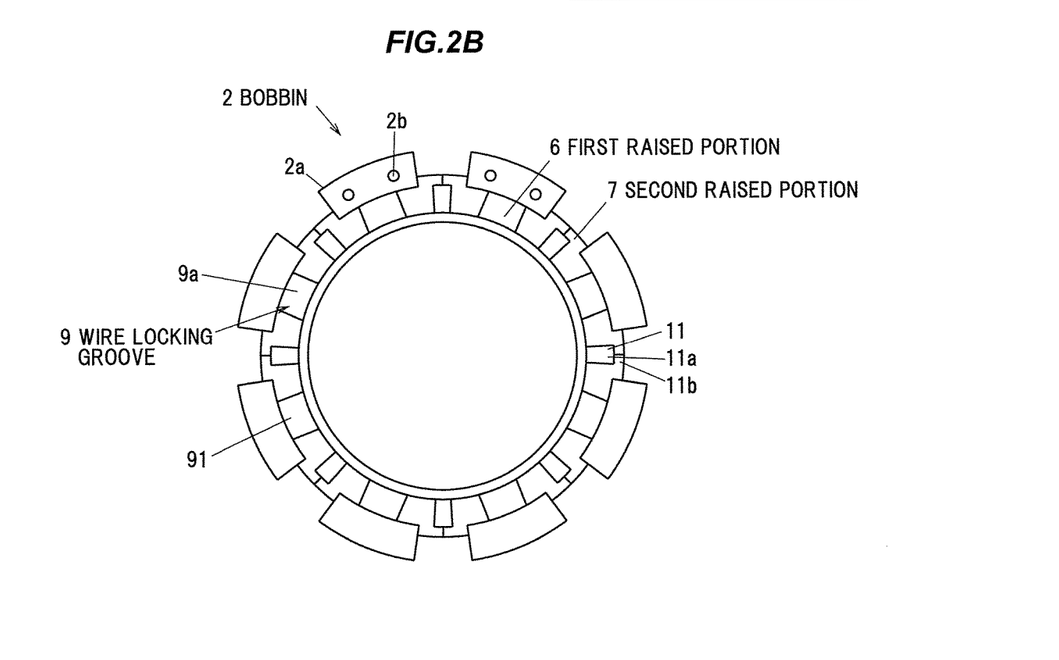
Figure 3A:
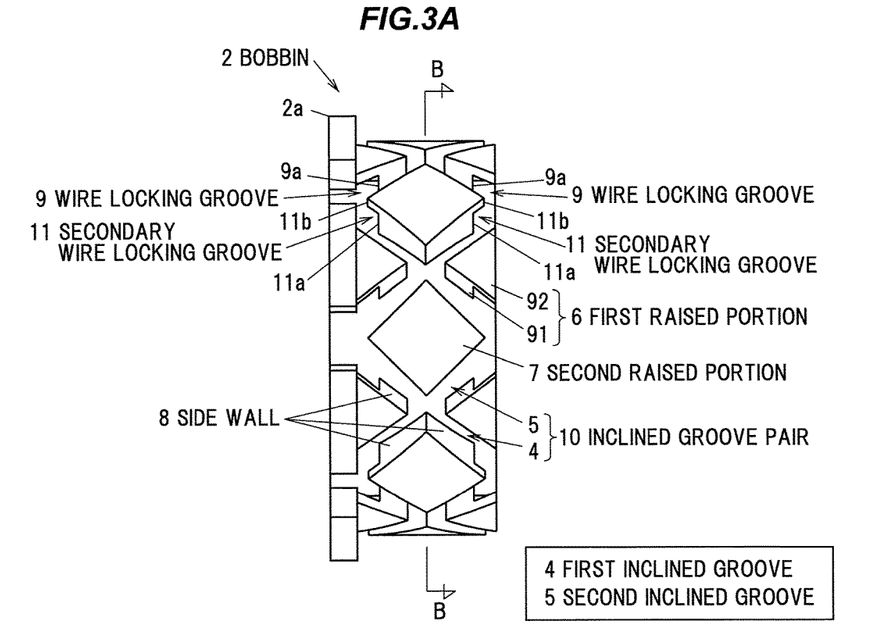
FIG. 3A is a side view showing the bobbin in FIG. 2A.
Figure 3B:
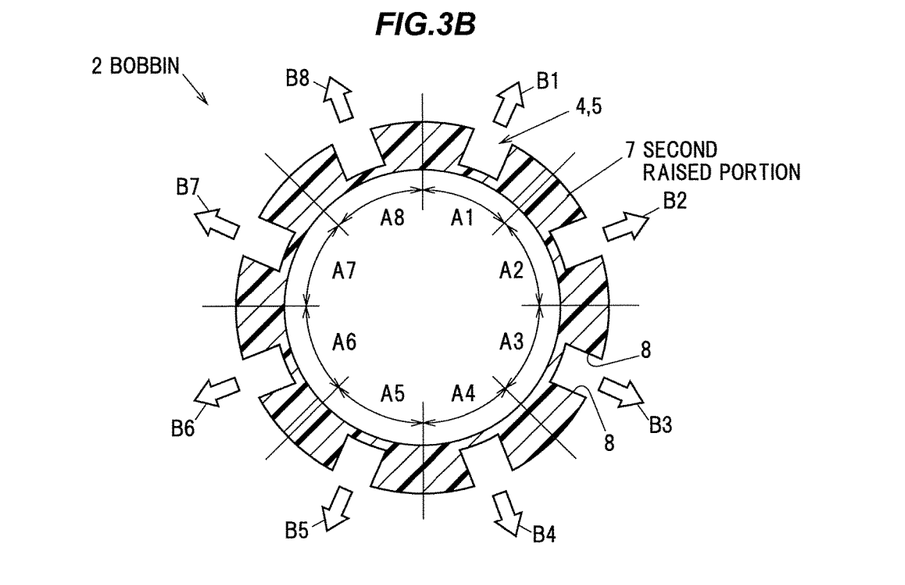
FIG. 3B is a cross sectional view taken along a line B-B in FIG. 3A.

FIGS. 2A and 2B are diagrams illustrating the bobbin 2 used to form the torque sensor coil 1, wherein FIG. 2A is a perspective view and FIG. 2B is a front view. FIG. 3A is a side view showing the bobbin 2 in FIG. 2A and FIG. 3B is a cross sectional view taken along the line B-B in FIG. 3A.

As shown in FIGS. 2A to 3B, the bobbin 2 has a hollow cylindrical shape overall. Plural first inclined grooves 4 and plural second inclined grooves 5 are formed on the outer peripheral surface of the bobbin 2. The first inclined grooves 4 are inclined at a predetermined angle relative to an axial direction of the rotating shaft 101, and the second inclined grooves 5 are inclined at a predetermined angle relative to the axial direction in a direction opposite to the first inclined grooves 4 (but at the same angle as the first inclined grooves 4). The first inclined grooves 4 and the second inclined grooves 5 are formed of grooves which are dent in a radial direction of the bobbin 2.

On the bobbin 2 in the present embodiment, the first inclined grooves 4 are formed to be inclined at +45 degrees relative to the axial direction, and the second inclined grooves 5 are formed to be inclined at −45 degrees relative to the axial direction. In the torque sensor 100, the detection coils 3 are formed by winding insulated wires along the first and second inclined grooves 4 and 5. Since variation in magnetic permeability when torque is applied to the rotating shaft 101 is the largest in directions of ±45 degrees relative to the axial direction, the first and second inclined grooves 4 and 5 are inclined at ±45 degree relative to the axial direction to improve detection sensitivity.

The inclination angle of the first and second inclined grooves 4 and 5 is not limited to ±45 degrees. However, sensitivity decreases when the inclination angle of the first and second inclined grooves 4 and 5 is too large or too small. Therefore, the inclination angle of the first and second inclined grooves 4 and 5 relative to the axial direction is desirably in a range of ±30 to 60 degrees.

In the present embodiment, eight first inclined grooves 4 are formed at equal intervals in a circumferential direction and eight second inclined grooves 5 are formed at equal intervals in the circumferential direction, so that zig-zag grooves on the whole are formed on the outer peripheral surface of the bobbin 2. However, the numbers of the first and second inclined grooves 4 and 5 are not limited thereto and can be appropriately changed according to the outer diameter of the bobbin 2 or the outer diameter of the rotating shaft 101, etc.

In addition, in the present embodiment, one first inclined groove 4 and one second inclined groove 5 intersect at the center in the axial direction and form an X-shape, and pairs of the first inclined groove 4 and the second inclined groove 5 intersecting in an X-shape (hereinafter, referred to as "inclined groove pair 10") are arranged at equal intervals in the circumferential direction. Both ends of the first inclined groove 4 of a given inclined groove pair 10 are connected to respective one ends of the second inclined grooves 5 of the inclined groove pairs 10 adjacent (on both sides in the circumferential direction) to the given inclined groove pair 10. Likewise, both ends of the second inclined groove 5 of a given inclined groove pair 10 are connected to respective one ends of the first inclined grooves 4 of the inclined groove pairs 10 adjacent (on both sides in the circumferential direction) to the given inclined groove pair 10.

Thus, at both axial ends of the bobbin 2, plural (eight on each end) triangular first raised portions 6 each surrounded by the first inclined groove 4 and the second inclined groove 5 are formed and constitute axial end faces of the bobbin 2. In the present embodiment, the first raised portion 6 when viewed from the outside in the radial direction has a substantially isosceles triangle with an apex facing axially inward. The first raised portions 6 are arranged at equal intervals in the circumferential direction of the bobbin 2 so that the first raised portions 6 provided at one axial end of the bobbin 2 axially face the first raised portions 6 provided at the other axial end with the intersections of the first and second inclined grooves 4 and 5 interposed therebetween.

The bobbin 2 also has plural (eight) rectangular second raised portions 7 which are formed at the center in the axial direction and each of which is surrounded by two adjacent first inclined grooves 4 and two adjacent second inclined grooves 5. The second raised portions 7 are arranged at equal intervals in the circumferential direction of the bobbin 2 so that each second raised portion 7 is located between circumferentially adjacent two first raised portions 6 (at a circumferential midpoint between circumferentially adjacent first raised portions 6).

Flanges 2a are formed on the bobbin 2 at one axial end (at a left end in FIG. 3A) so as to extend radially outward from the outer surface of the bobbin 2. In this example, plural arcuate flanges 2a are formed such that each flange 2a extends radially outward from an axially outer end of the first raised portion 6. The flanges 2a serve to fix connection terminals and also serve to restrict the magnetic ring 102 from moving in the axial direction and to align the magnetic ring 102 with the bobbin 2.

Some of the plural flanges 2a have terminal attachment holes 2b for inserting and fixing connection terminals (not shown) which are provided at ends of the insulated wires constituting the detection coils 3. Although two adjacent flanges 2a each having two terminal attachment holes 2b are shown in the present embodiment, the positions of the terminal attachment holes 2b (i.e., the position of the connection terminals) can be appropriately changed.

In the present embodiment, the detection coils 3 are formed on the outer peripheral surface of the bobbin 2. Thus, the bobbin 2 need to be formed of a non-magnetic material which does not have an effect on a magnetic flux generated by the detection coils 3. Meanwhile, when the torque sensor 100 is used in an environment in which the torque sensor 100 comes into contact with oil such as lubricant oil, it is necessary to use the bobbin 2 which is formed of an oil resistant material. Furthermore, when the torque sensor 100 is used in a high-temperature environment, it is desirable to use the bobbin 2 which is formed of a heat resistant material. In the present embodiment, a resin which is a non-magnetic material is used to form the bobbin 2.

Furthermore, it is desirable to use the bobbin 2 having a linear expansion coefficient equivalent to that of copper (the insulated wire) so that the insulated wires consisting mainly of copper are not broken by thermal expansion of the bobbin 2. In more detail, a resin used to form the bobbin 2 desirably has a linear expansion coefficient of within ±25% of the linear expansion coefficient of copper. Since the linear expansion coefficient of copper is $1.66 \times 10^{-5}$ to $1.68 \times 10^{-5}/°$ C., a resin having a linear expansion coefficient of not less than $1.25 \times 10^{-5}/°$ C. and not more than $2.1 \times 10^{-5}/°$ C. is desirably used to form the bobbin 2.

Examples of resins satisfying such conditions include a polyphthalamide resin (PPA), a polyether ether ketone resin (PEEK) and a polyphenylene sulfide resin (PPS), etc. Of those, PPA and PPS have a linear expansion coefficient of $1.3 \times 10^{-5}$ to $1.5 \times 10^{-5}/°$ C. It is also possible to adjust the linear expansion coefficient by adding glass fibers to a resin used to form the bobbin 2. By using the bobbin 2 formed of such resins, it is possible to realize the torque sensor 100 which is excellent in oil resistance and heat resistance and has high reliability.

In the present embodiment, the bobbin 2 is formed of a molded resin article which is formed by molding a resin (injection molding) using a mold. Next, a specific configuration allowing a mold to be used will be described in detail.

In the torque sensor coil 1 of the present embodiment, the bobbin 2 is circumferentially divided into plural regions in each of which all of side walls of the first inclined groove 4 and the second inclined groove 5 are parallel to a mold draw direction which is different for each region.

In the present embodiment, the bobbin 2 is divided into eight regions A1 to A8, which is the same number as the number of the first inclined grooves 4 and the number of the second inclined grooves 5, as shown in FIG. 3B. The regions A1 to A8 described here are sequentially formed in a clockwise direction when viewed from the flange 2a side in the axial direction. Each of the regions A1 to A8 is formed in a 45° angular range about the center axis of the bobbin 2 and has the same size. In other words, in the present embodiment, the regions A1 to A8 are provided by dividing the bobbin 2 into equal parts along the circumferential direction and each of the regions A1 to A8 has the same length.

The mold draw directions respectively corresponding to the regions A1 to A8 are indicated by arrows B1 to B8 in FIG. 3B. In the present embodiment, each of the mold draw directions (the arrows B1 to B8) is a radial direction (from the inside toward the outside in the radial direction) at the circumferential center of the corresponding region (A1-A8). Since the eight regions A1 to A8 are formed by circumferentially dividing the bobbin 2 into equal parts in the present embodiment, an angle formed between the mold draw directions of the circumferentially adjacent regions (e.g., the regions A1 and A2) is 45°, and the mold draw directions of the regions opposite in the radial direction of the bobbin 2 (e.g., the regions A1 and A5) are 180 degrees opposite from one another.

Alternatively, the mold draw directions may not be the radial direction at the circumferential centers of the corresponding regions A1 to A8 and can be different. However, since the mold draw directions are directions in which parts of the mold (slide cores 64, described later) are pulled away (the details will be described later), the mold draw directions need to be set so that each part of the mold can be removed without contact with the adjacent parts. For example, when the region A1 is formed from 0° to 45° in the circumferential direction of the bobbin 2, the mold draw direction in the region A1 can be set to a radial direction (from the inside toward the outside in the radial direction) at a circumferential position of not less than 0° and not more than 45°.

In the present embodiment, side walls 8 of the first inclined groove 4 and the second inclined groove 5 in a given region (A1-A8) are all parallel to the mold draw direction which is set for the given region (A1-A8). Therefore, in the present embodiment, an angle formed between the side walls 8 of the circumferentially adjacent regions (e.g., the regions A1 and A2) is 45°, and the side walls 8 of the regions opposite in the radial direction of the bobbin 2 (e.g., the regions A1 and A5) are parallel (the angle formed between the side walls is 180°). The side walls 8 of the first and second inclined grooves 4 and 5 here are, in other words, the side walls 8 of the first and second raised portions 6 and 7 facing with the first and second inclined grooves 4 and 5 interposed therebetween, and are step portions connecting bottom surfaces (bottom walls) of the first and second inclined grooves 4 and 5 to outer peripheral surfaces (outer walls) of the first and second raised portions 6 and 7.

In this configuration, since undercut portions are not formed when a resin molding is performed using eight circumferentially-arranged parts of the mold (sliding cores 64 described later) respectively corresponding to the regions A1 to A8, it is possible to draw each part of the mold after molding and thus possible to use resin molding to form the bobbin 2.

Although the side walls 8 are formed parallel to the mold draw directions in the present embodiment, the side walls 8 may be inclined with respect to the mold draw directions in such a manner that the first and second inclined grooves 4 and 5 are widened toward the outside in the radial direction, as long as the mold can be drawn.

In addition, in the present embodiment, the regions A1 to A8 are provided so that each of the regions A1 to A8 includes one inclined groove pair 10 (one first inclined groove 4 and one second inclined groove 5 which intersect in an X-shape). In other words, in the present embodiment, one first inclined groove 4 and one second inclined groove 5 are formed in each of the regions A1 to A8, and the number of the first inclined grooves 4 and the number of the second inclined grooves 5 are the same as the number of the regions A1 to A8. In addition, a boundary between two regions (e.g., the region A1 and A2) is located at the circumferential center of the second raised portion 7 (on a line connecting two corners located at both ends in the axial direction).

Since the regions A1 to A8 have boundaries at such positions, each second raised portion 7 is located across two regions. For example, the second raised portion 7 located across the region A1 and A2 is configured that the angle (direction) of the side walls 8 in the region A1 is different from that of the side walls 8 in the region A2, and an angle formed between the side walls 8 in the region A1 and the side walls 8 in the region A2 is 45° in the present embodiment. As a result, a distance between the opposite side walls 8 of the second raised portion 7 gradually increases toward the outside in the radial direction, and the insulated wires are thus less likely to slip off of the first and second inclined grooves 4 and 5 when the detection coils 3 are formed by winding the insulated wires.

In addition, in the present embodiment, the bobbin 2 is configured that a wire locking groove 9 extending along the circumferential direction of the bobbin 2 is formed on an axial end face of each first raised portion 6. The wire locking groove 9 is an arc-shaped groove which opens axially outward and is connected, at both circumferential ends, to the first inclined groove 4 and the second inclined groove 5.

The wire locking groove 9 serves as a guide path for guiding the insulated wires in the circumferential direction of the bobbin 2 between adjacent first inclined grooves 4 or between adjacent second inclined grooves 5, and a portion of the insulated wire located between the adjacent first inclined grooves 4 or between the adjacent second inclined grooves 5 is housed in the wire locking groove 9. The wire locking groove 9 does not open radially outward, and thus restricts radially outward movement of the insulated wires housed in the wire locking groove 9 and thereby serves to prevent the insulated wires (the detection coils 3) from slipping off of the bobbin 2. Although the details will be described later, the wire locking grooves 9 are formed by parts of the mold (an upper mold 62 and a lower mold 63 described later) which are provided separately from the parts (sliding cores 64 described later) for forming the first and second inclined grooves 4 and 5 and are drawn in the axial direction.

Since the wire locking groove 9 is formed, the first raised portion 6 integrally has a stem portion 91 providing a bottom wall 9a of the wire locking groove 9 and extending along the radial direction of the bobbin 2 and a canopy portion 92 extending axially outward from a radially outward end of the stem portion 91. The stem portion 91 receives the wound insulated wires and the canopy portion 92 prevents the insulated wires from slipping off. The flange 2a is provided to protrude radially outward from an end of the canopy portion 92 (an end opposite to the stem portion 91) of the first raised portion 6 provided at one edge in the axial direction.

Furthermore, in the present embodiment, the second raised portion 7 is arranged to overlap the first raised portions 6 in the axial direction of the bobbin 2, and has secondary wire locking grooves 11 which open axially outward and each have a bottom wall 11a at the same axial position as the bottom walls 9a of the wire locking grooves 9 of the first raised portions 6. Both the bottom walls 9a and 11a are formed perpendicular to the axial direction.

In the present embodiment, the second raised portions 7 are arranged to overlap, in the axial direction, the first raised portions 6 provided at the one and other axial ends and each second raised portion 7 has the secondary wire locking grooves 11 one each at both ends in the axial direction.

The secondary wire locking groove 11 is a groove by which the insulated wire after passing through the wire locking groove 9 is further guided to the first inclined groove 4 or the second inclined groove 5. The secondary wire locking groove 11 does not open radially outward, and second canopy portions 11b protruding outward in the axial direction are integrally formed at ends of the second raised portion 7 on a radially outward side and prevents the insulated wires housed in the secondary wire locking groove 11 from slipping off.

As such, the secondary wire locking grooves 11 are provided. Therefore, even when the second raised portions 7 are arranged to overlap the first raised portions 6 (even when the bottom walls 9a of the wire locking grooves 9 are located axially inward relative to the second raised portions 7), it is possible to guide the insulated wire along the circumferential direction by the wire locking grooves 9 and the secondary wire locking grooves 11, which contributes to downsizing of the bobbin 2, i.e., downsizing of the torque sensor coil 1.

Description of the Detection Coil 3

Figure 4A:
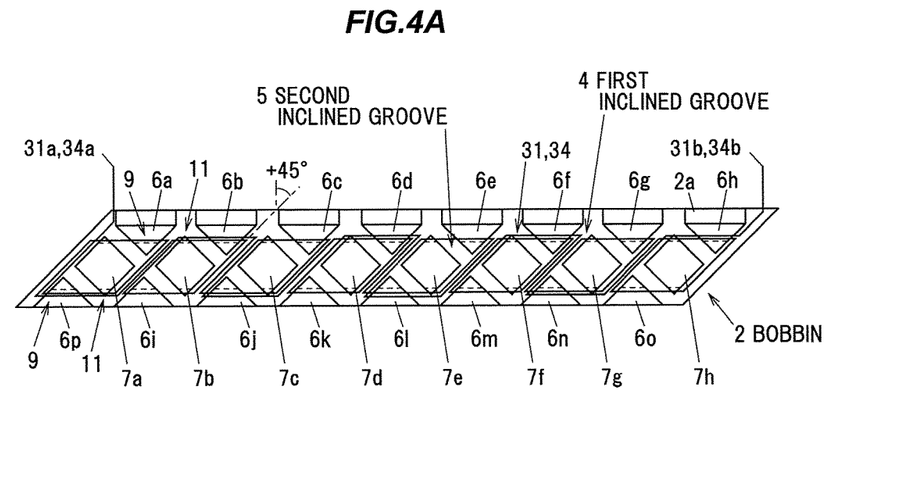
FIG. 4A is an explanatory diagram illustrating how to wind insulated wires to form first and fourth detection coils and FIG. 4B is an explanatory diagram illustrating how to wind insulated wires to form second and third detection coils.
Figure 4B:
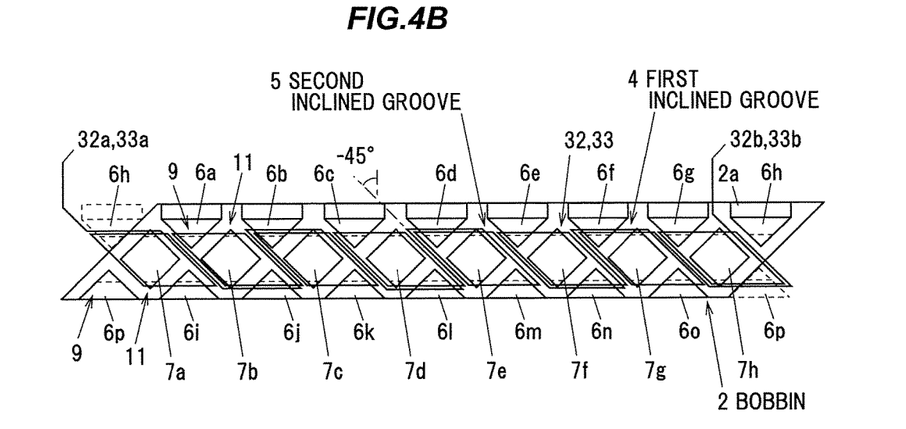

FIGS. 4A and 4B are schematic exploded plan views showing the bobbin 2. The right and left edges in the drawing are actually connected. In FIG. 4A, a first detection coil 31 and a fourth detection coil 34 are illustrated by one line. In FIG. 4B, a second detection coil 32 and a third detection coil 33 are illustrated by one line.

As shown in FIGS. 4A and 4B, the torque sensor coil 1 is provided with the first detection coil 31 and the fourth detection coil 34 which are formed by winding insulated wires around the bobbin 2 along the first inclined grooves 4, and the second detection coil 32 and the third detection coil 33 which are formed by winding insulated wires around the bobbin 2 along the second inclined grooves 5.

In the present embodiment, the first detection coil 31 and the fourth detection coil 34 are formed by winding insulated wires around the bobbin 2 along the first inclined groove 4, the wire locking groove 9 and the secondary wire locking groove 11. The second detection coil 32 and the third detection coil 33 are formed by winding insulated wires around the bobbin 2 along the second inclined groove 5, the wire locking groove 9 and the secondary wire locking groove 11. Each of the first detection coil 31, the second detection coil 32, the third detection coil 33 and the fourth detection coil 34 is formed in layers.

When winding the insulated wires around the bobbin 2, the bobbin 2 is fixed to a jig. The insulated wire which can be suitably used here is an insulated wire in which an insulation layer excellent in oil resistance and heat resistance is provided around a conductor formed of, e.g., copper, or copper plated with nickel, etc. The insulation layer of the insulated wire can be formed of, e.g., polyester, polyimide or polyamide-imide. The outer diameter of the insulated wire is, e.g., 0.12 mm but can be appropriately changed.

In FIGS. 4A and 4B, eight first raised portions 6 arranged in the circumferential direction of the bobbin 2 on the flange 2a side are denoted by 6a to 6h. Meanwhile, eight first raised portions 6, which are arranged in the circumferential direction of the bobbin 2 on the opposite side to the flange 2a and face the first raised portions 6a to 6h, are denoted by 6i to 6p. Then, eight second raised portions 7 arranged in the circumferential direction of the bobbin 2 are denoted by 7a to 7h.

In FIG. 4A, start and finish ends of one layer of the first detection coil 31 are respectively denoted by 31a and 31b, and start and finish ends of one layer of the fourth detection coil 34 are respectively denoted by 34a and 34b. In FIG. 4B, start and finish ends of one layer of the second detection coil 32 are respectively denoted by 32a and 32b, and start and finish ends of one layer of the third detection coil 33 are respectively denoted by 33a and 33b.

As shown in FIG. 4A, two insulated wires respectively constituting the first detection coil 31 and the fourth detection coil 34 are wound once around the first raised portions 6a, 6p and the second raised portion 7a. At this time, the insulated wires between adjacent first inclined grooves 4 are housed in the wire locking grooves 9 and the secondary wire locking grooves 11, and the wound insulated wires form a closed parallelogram. After that, the insulated wires are wound once around the first raised portions 6i, 6b and the second raised portion 7b, then wound once around the first raised portions 6j, 6c and the second raised portion 7c, then wound once around the first raised portions 6k, 6d and the second raised portion 7d, then wound once around the first raised portions 6l, 6e and the second raised portion 7e, then wound once around the first raised portions 6m, 6f and the second raised portion 7f, then wound once around the first raised portions 6n, 6g and the second raised portion 7g, and then wound once around the first raised portions 6o, 6h and the second raised portion 7h. Through the above process, one round (one turn) of the insulated wires constituting the first detection coil 31 and the fourth detection coil 34 is completed.

As shown in FIG. 4B, two insulated wires respectively constituting the second detection coil 32 and the third detection coil 33 are wound once around the first raised portions 6h, 6i and the second raised portion 7a. At this time, the insulated wires between adjacent second inclined grooves 5 are housed in the wire locking grooves 9 and the secondary wire locking grooves 11, and the wound insulated wires form a closed parallelogram. After that, the insulated wires are wound once around the first raised portions 6a, 6j and the second raised portion 7b, then wound once around the first raised portions 6b, 6k and the second raised portion 7c, then wound once around the first raised portions 6c, 6l and the second raised portion 7d, then wound once around the first raised portions 6d, 6m and the second raised portion 7e, then wound once around the first raised portions 6e, 6n and the second raised portion 7f, then wound once around the first raised portions 6f, 6o and the second raised portion 7g, and then wound once around the first raised portions 6g, 6p and the second raised portion 7h. Through the above process, one round (one turn) of the insulated wires constituting the second detection coil 32 and the third detection coil 33 is completed.

After such insulated wire-winding process is repeated until reaching the desired number of turns, the first to fourth detection coils 31 to 34 are obtained. The number of turns of the first to fourth detection coils 31 to 34 is, e.g., 20 to 40. The method of winding the insulated wires is not limited to that shown in the drawings. However, the insulated wires are generally wound using a dedicated winding machine and, in view of facilitating the process of winding the insulated wires, it is more desirable to use the method described in FIGS. 4A and 4B. That is, it is possible to improve productivity by winding the insulated wires using the method described in FIGS. 4A and 4B.

Configuration of Measurement Portion

Figure 5:
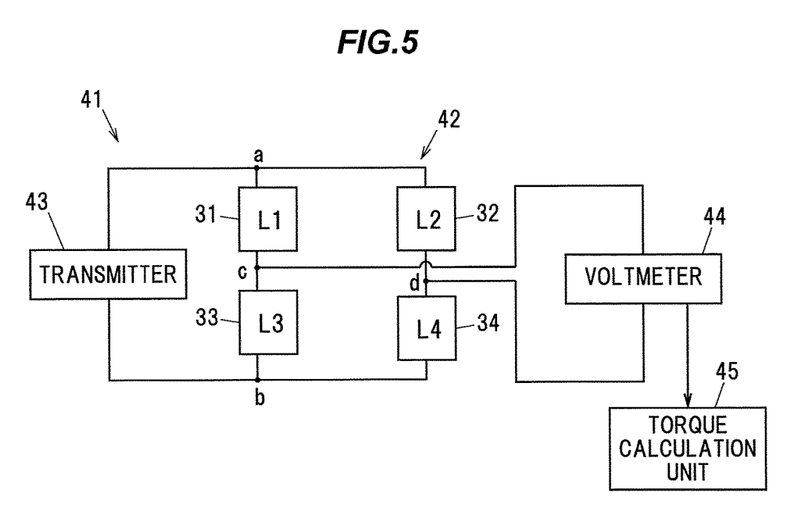
FIG. 5 is a circuit diagram illustrating a configuration example of a measurement portion which measures torque applied to the rotating shaft based on a detection signal of the torque sensor.

FIG. 5 is a circuit diagram illustrating a configuration example of a measurement portion 41 which measures torque applied to the rotating shaft 101 based on a detection signal of the torque sensor 100. The measurement portion 41 detects variation in inductances of the first to fourth detection coils 31 to 34 and thereby measures torque applied to the rotating shaft 101.

Hereinafter, inductance of the first detection coil 31 is denoted by L1, inductance of the second detection coil 32 is denoted by L2, inductance of the third detection coil 33 is denoted by L3, and inductance of the fourth detection coil 34 is denoted by L4.

The measurement portion 41 is provided with a bridge circuit 42, a transmitter 43, a voltage measurement circuit 44 and a torque calculation unit 45. The bridge circuit 42 is formed by annularly connecting the first detection coil 31, the second detection coil 32, the fourth detection coil 34 and the third detection coil 33 in this order. The transmitter 43 applies AC voltage to a junction a between the first detection coil 31 and the second detection coil 32 and to a junction b between the third detection coil 33 and the fourth detection coil 34. The voltage measurement circuit 44 detects voltage at a junction c between the first detection coil 31 and the third detection coil 33 and at a junction d between the second detection coil 32 and the fourth detection coil 34. The torque calculation unit 45 calculates torque applied to the rotating shaft 101 based on the voltages measured by the voltage measurement circuit 44. The bridge circuit 42 is configured such that the first detection coil 31 and the fourth detection coil 34 are arranged on a pair of opposite sides and the second detection coil 32 and the third detection coil 33 are arranged on another pair of opposite sides.

In the measurement portion 41, when torque is not applied to the rotating shaft 101, the inductances L1 to L4 of the first to fourth detection coils 31 to 34 are equal to each other and voltage detected by the voltage measurement circuit 44 is substantially zero.

When torque is applied to the rotating shaft 101, magnetic permeability in a direction of +45 degrees relative to the axial direction decreases (or increases) and magnetic permeability in a direction of −45 degrees relative to the axial direction increases (or decreases). Thus, when torque is applied to the rotating shaft 101 in a state in which AC voltage is applied from the transmitter 43, inductances of the first detection coil 31 and the fourth detection coil 34 decrease (or increase) and inductances of the second detection coil 32 and the third detection coil 33 increase (or decrease). As a result, voltage detected by the voltage measurement circuit 44 varies. Based on the variation in voltage, the torque calculation unit 45 calculates torque applied to the rotating shaft 101.

Since the configuration of the first and fourth detection coils 31 and 34 is entirely the same as the configuration of the second and third detection coils 32 and 33 except the winding direction, an effect of temperature, etc., on inductances of the first to fourth detection coils 31 to 34 can be cancelled out by using the bridge circuit 42 as shown in FIG. 5 and it is thus possible to accurately detect torque applied to the rotating shaft 101. In addition, in the torque sensor 100, when the inductances of the first detection coil 31 and the fourth detection coil 34 increase (or decrease), the inductances of the second detection coil 32 and the third detection coil 33 always decrease (or increase). Therefore, it is possible to further improve detection sensitivity by using the bridge circuit 42 as shown in FIG. 5.

Description of Mold Used for Forming the Bobbin 2

Figure 6A:
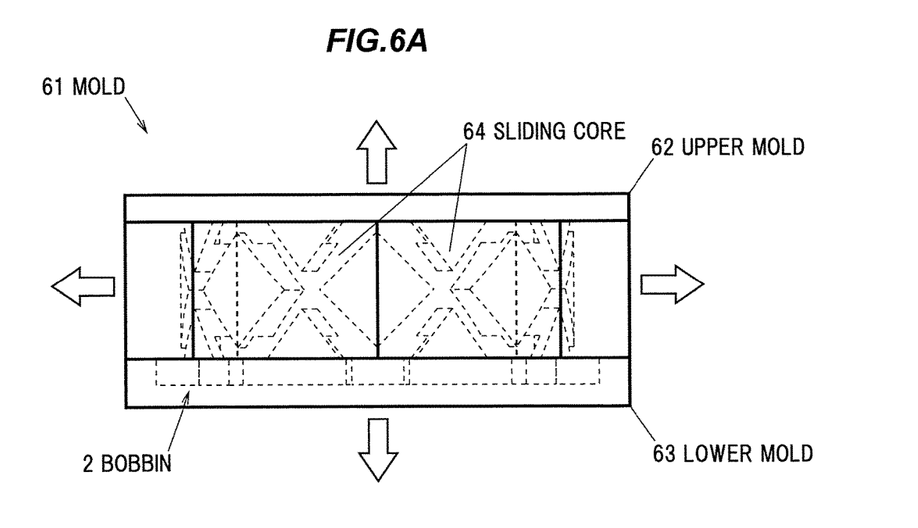
FIG. 6A is a diagram when viewed from the outside in a radial direction of the bobbin and FIG. 6B is a diagram when viewed in an axial direction of the bobbin and in which a lower mold is omitted.
Figure 6B:
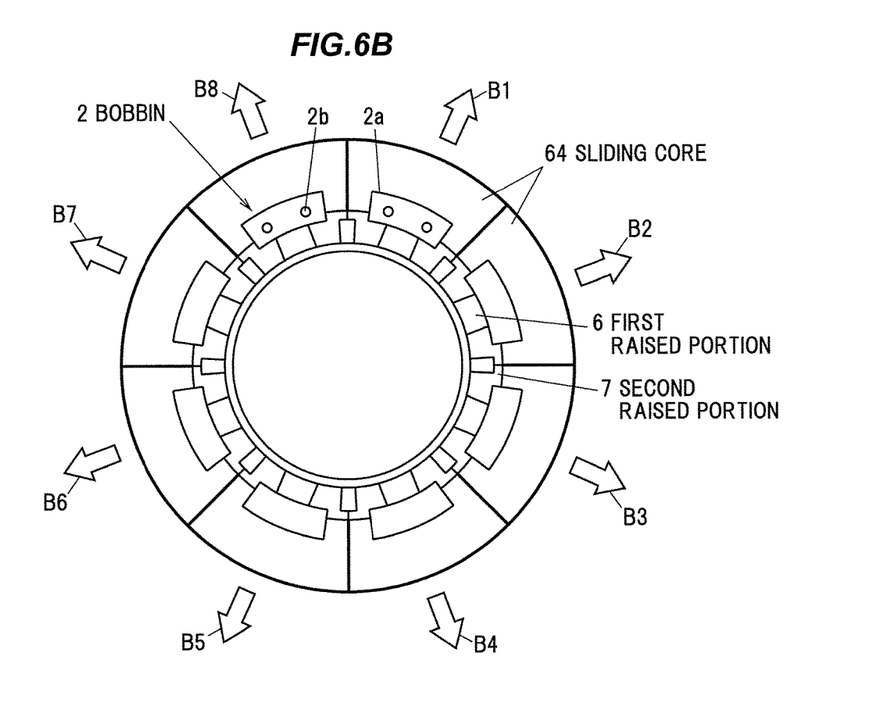
Figure 7A:
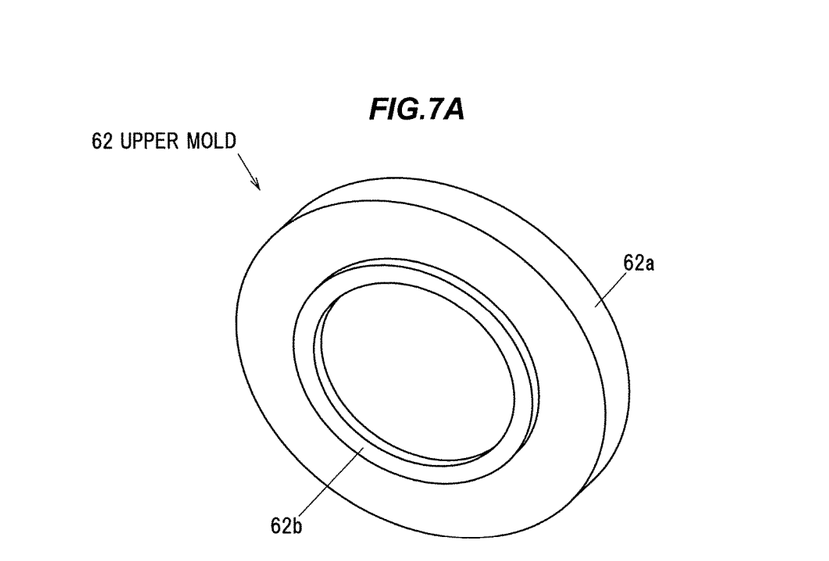
FIG. 7A is a perspective view showing an upper mold.
Figure 7B:
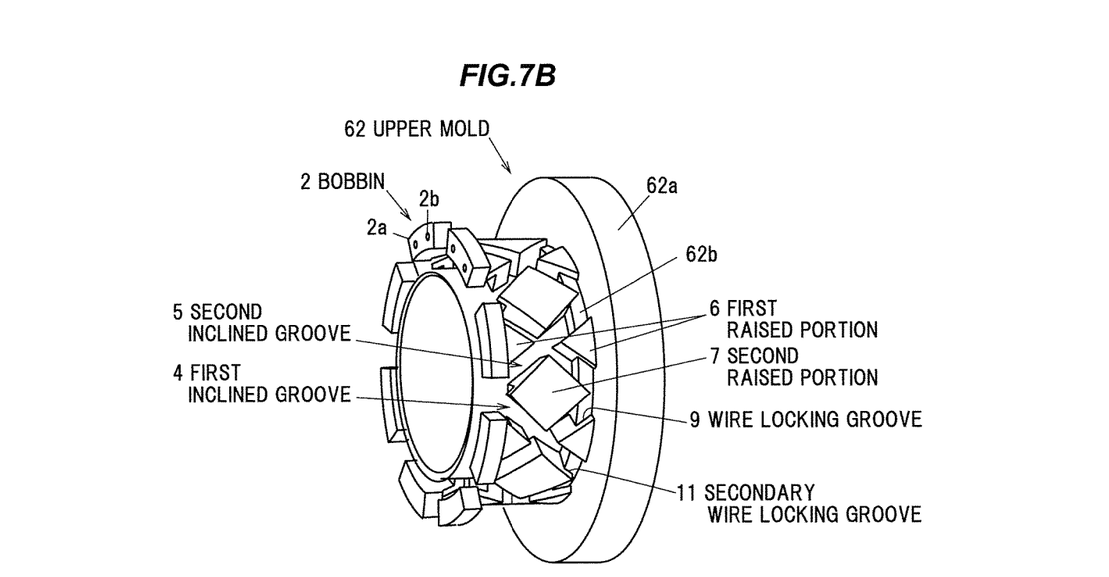
FIG. 7B is a perspective view showing the upper mold with the bobbin.

FIGS. 6A and 6B are diagrams illustrating a mold used to form the bobbin 2, wherein FIG. 6A is a diagram when viewed from the outside in the radial direction of the bobbin 2 and FIG. 6B is a diagram when viewed in an axial direction of the bobbin 2 and in which a lower mold is omitted.

As shown in FIGS. 6A and 6B, a mold 61 used for molding the bobbin 2 has an upper mold 62, a lower mold 63 and eight sliding cores (radial type) 64.

The number of the sliding cores 64 is the same as the number of the regions A1 to A8 of the bobbin 2. The eight sliding cores 64 when combined form a hollow cylindrical shape as a whole. The upper mold 62 and the lower mold 63 are provided to respectively cover openings of the combined sliding cores 64 (openings which open in the axial direction). The mold draw directions of the upper mold 62 and the lower mold 63 are directions along the axial direction (outward in the axial direction) and the draw directions of the respective sliding cores 64 are the mold draw directions of the corresponding regions A1 to A8 (the directions along the arrows B1 to B8). The axial, circumferential and radial directions here mean the axial, circumferential and radial directions of the molded bobbin 2.

As shown in FIGS. 6A to 7B, the upper mold 62 integrally has an upper-mold disc portion 62a having a circular disc shape and a ring-shaped upper-mold annular protrusion 62b axially protruding from a surface, in the axial direction, of the upper-mold disc portion 62a. The upper-mold annular protrusion 62b is to form the wire locking grooves 9 of the first raised portions 6 and the secondary wire locking grooves 11 of the second raised portions 7.

As shown in FIGS. 6A, 6B, 8A and 8B, the lower mold 63 integrally has a lower-mold disc portion 63a having a circular disc shape, a columnar center protrusion 63b axially protruding from a surface, in the axial direction, of the lower-mold disc portion 63a, and a ring-shaped lower-mold annular protrusion 63c which is formed coaxially with and at a distance from the center protrusion 63b and axially protrudes from the surface, in the axial direction, of the lower-mold disc portion 63a. The center protrusion 63b is to form a hollow portion for allowing insertion of the rotating shaft 101, and the lower-mold annular protrusion 63c is to form the wire locking grooves 9 of the first raised portions 6 and the secondary wire locking grooves 11 of the second raised portions 7 in the same manner as the upper-mold annular protrusion 62b.

Figure 8A:
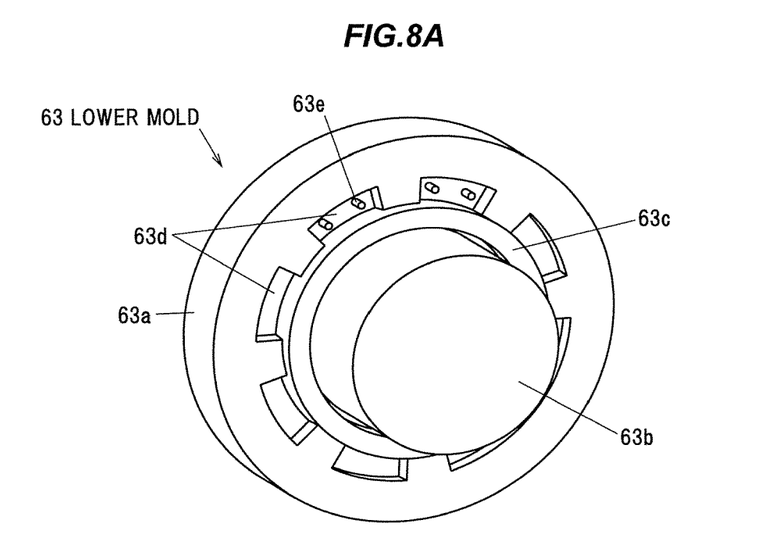
FIG. 8A is a perspective view showing a lower mold.
Figure 8B:
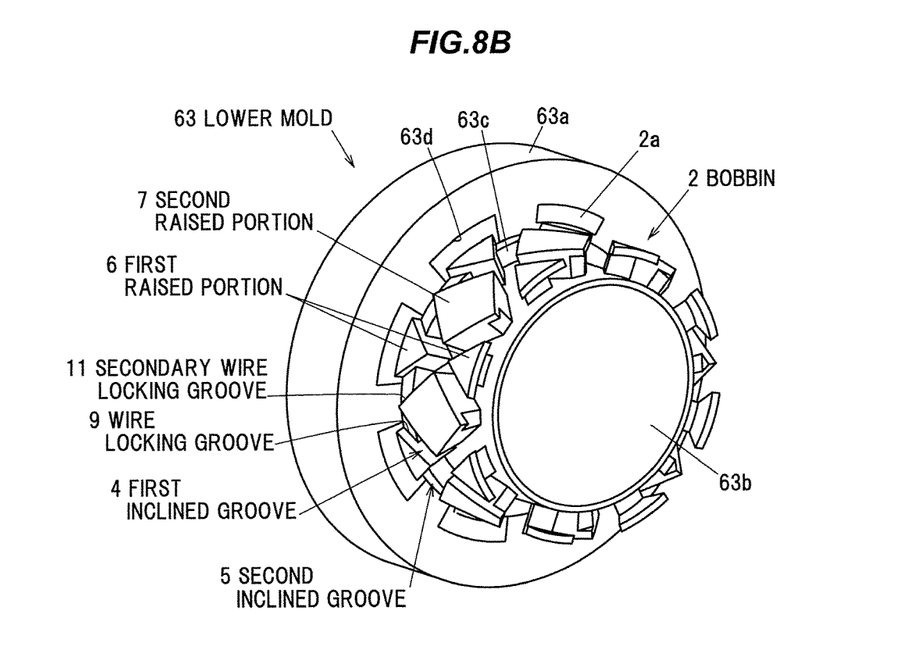
FIG. 8B is a perspective view showing the lower mold with the bobbin.
Figure 9A:
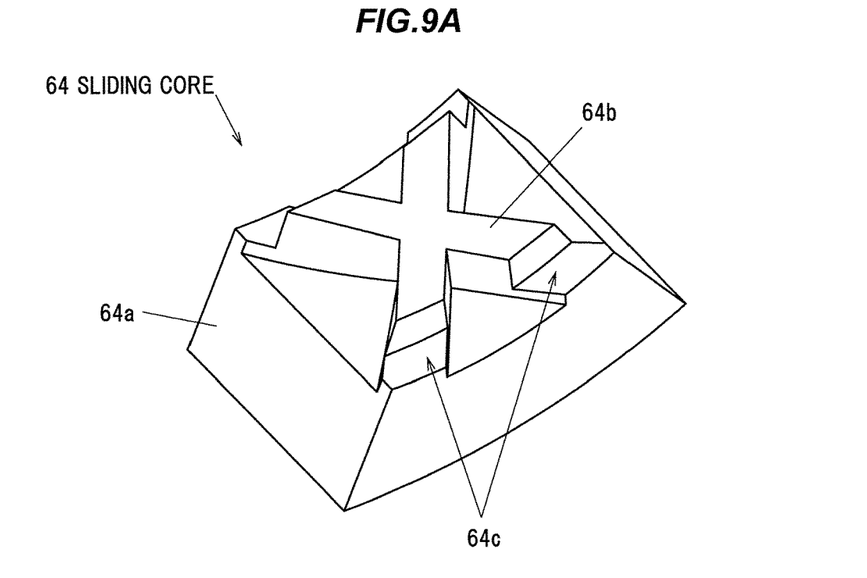
FIG. 9A is a perspective view showing a sliding core.
Figure 9B:
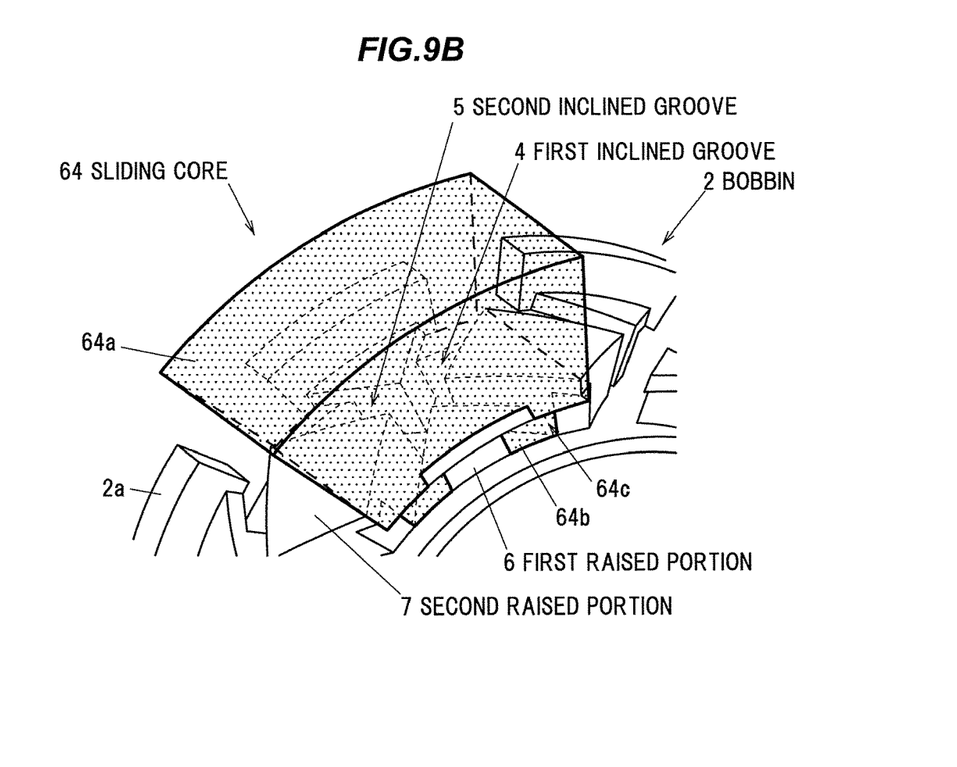
FIG. 9B is a perspective view showing the sliding core with the bobbin.

Recessed portions 63d for forming the flanges 2a are also provided on the lower-mold disc portion 63a so as to be dent in the axial direction from the surface in the axial direction (the surface on which the center protrusion 63b and the lower-mold annular protrusion 63c are formed). Protrusions 63e for forming the terminal attachment holes 2b are formed on the bottom surfaces of some recessed portions 63d so as to protrude in the axial direction.

As shown in FIGS. 6A, 6B, 9A and 9B, the sliding core 64 has an arc shape on a cross section perpendicular to the axial direction, and integrally has an arcuate portion 64a having a rectangular shape on a cross section perpendicular to the circumferential direction and an X-shaped inclined groove-forming protrusion 64b protruding radially inward from the inner wall of the arcuate portion 64a. The inclined groove-forming protrusion 64b is to form the first and second inclined grooves 4 and 5. Step portions 64c are formed at both axial ends of the inclined groove-forming protrusion 64b to avoid contact with the upper-mold annular protrusion 62b and the lower-mold annular protrusion 63c when combined with the upper mold 62 and the lower mold 63.

The mold 61 is assembled by combining the upper mold 62, the lower mold 63 and the eight sliding cores 64, and the bobbin 2 is formed by pouring a resin into the mold 61. Although a position of a sprue for introducing the resin is not described here, the position of the sprue is not specifically limited. For example, the sprue may be formed on one of the sliding cores 64.

Functions and Effects of the Embodiment

As described above, the torque sensor coil 1 in the present embodiment is configured that the bobbin 2 is divided, in the circumferential direction, into plural regions A1 to A8 in each of which the side walls 8 of the first and second inclined grooves 4 and 5 are all parallel to the mold draw direction (a direction of one of the arrows B1 to B8) set to be different for each of the regions A1 to A8 or are inclined with respect to the parallel direction in such a manner that the first and second inclined grooves 4 and 5 are widened toward the outside in a radial direction.

This eliminates undercut portions and the bobbin 2 thus can be manufactured by resin molding using the mold 61. As a result, as compared to when the first and second inclined grooves 4 and 5 are formed by the cutting process as is in the conventional technique, mass productivity of the torque sensor coil 1 is improved and it is thus possible to reduce the manufacturing cost.

Summary of the Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A torque sensor coil (1) used to form a torque sensor (100) to be attached around a magnetostrictive rotating shaft (101) to measure torque applied to the rotating shaft (101), the torque sensor coil (1) comprising: a non-magnetic bobbin (2) that is provided coaxially with and at a distance from the rotating shaft (101), is formed into a hollow cylindrical shape, and comprises a plurality of first inclined grooves (4) and a plurality of second inclined grooves (5) on the outer peripheral surface, the first inclined guide grooves (4) being inclined at a predetermined angle relative to an axial direction and the second inclined grooves (5) being inclined at the predetermined angle relative to the axial direction in a direction opposite to the first inclined grooves (4); a first detection coil (31) formed by winding an insulated wire around the bobbin (2) along the first inclined grooves (4); and a second detection coil (32) formed by winding an insulated wire around the bobbin (2) along the second inclined grooves (5), wherein the bobbin (2) is divided into a plurality of regions (A1 to A8) along the circumferential direction, side walls (8) of the first and second inclined grooves (4, 5) in each region (A1 to A8) are all parallel to a mold draw direction set to be different for each region (A1 to A8) or are inclined with respect to the parallel direction in such a manner that the first and second inclined grooves (4, 5) are widened toward the outside in a radial direction.

[2] The torque sensor coil (1) defined by [1], wherein the bobbin (2) comprises a plurality of first raised portions (6) at both axial ends, each first raised portion (6) is surrounded by the first inclined groove (4) and the second inclined groove (5), constitutes an axial end face of the bobbin (2) and comprises a wire locking groove (9) on an axial end face, and the wire locking groove (9) is formed along a circumferential direction of the bobbin (2), opens axially outward, is connected to the first and second inclined grooves (4, 5) at circumferential ends, houses the insulated wire between the first inclined grooves (4) adjacent to each other or between the second inclined grooves (5) adjacent to each other, and is provided to restrict the insulated wire from moving radially outward and thereby to prevent the insulated wire from slipping off of the bobbin (2).

[3] The torque sensor coil (1) defined by [2], wherein the bobbin (2) comprises a plurality of second raised portions (7) each surrounded by two of the first inclined grooves (4) adjacent to each other and two of the second inclined grooves (5) adjacent to each other, and each of the second raised portions (7) is configured that a distance between opposite side walls (8) gradually increases toward the outside in the radial direction.

[4] The torque sensor coil (1) defined by [3], wherein the second raised portions (7) are arranged to overlap the first raised portions (6) in the axial direction of the bobbin (2), and each of the second raised portions (7) comprises secondary wire locking grooves (11) each having a bottom wall (11a) at the same axial position as a bottom wall (9a) of the first raised portion (9) and opening axially outward.

[5] The torque sensor coil (1) defined by [4], wherein the first raised portions (6) are arranged at equal intervals in the circumferential direction of the bobbin (2) so that the first raised portions (6) provided at one axial end of the bobbin (2) axially face the first raised portions (6) provided at the other axial end, the second raised portions (7) are arranged at equal intervals in the circumferential direction of the bobbin (2) at positions between the first raised portions (6) circumferentially adjacent to each other so as to overlap the first raised portions (6) provided at the one and other axial ends, and each of the second raised portions (7) comprises the secondary wire locking grooves (11) at both ends in the axial direction.

[6] The torque sensor (1) defined by any one of [1] to [5], wherein a plurality of inclined groove pairs (10) are provided along the circumferential direction, each inclined groove pair (10) comprising one of the first inclined grooves (4) and one of the second inclined grooves (5) that intersect each other, and the regions (A1 to A8) are provided so that one inclined groove pair (10) is included in each region.

[7] The torque sensor (1) defined by any one of [1] to [6], wherein the mold draw direction is a radial direction at the circumferential center of the corresponding region (A1 to A8).

[8] A torque sensor (100) comprising: the torque sensor coil defined by any one of [1] to [7].

Although the embodiment of the invention has been described, the invention according to claims is not to be limited to the embodiment. Further, please note that all combinations of the features described in the embodiment are not necessary to solve the problem of the invention.

The invention can be appropriately modified and implemented without departing from the gist of the invention. For example, although the bobbin 2 is divided into the eight regions A1 to A8 in the circumferential direction in the embodiment, the number of the region is not limited thereto. However, when the number of the regions is too small, the inclination angle of the grooves becomes too large at circumferential ends of the regions and this makes difficult to wind the insulated wires, and also, an angle of the raised portions 6 and 7 at rim becomes acute and this causes defects such as chipped portion to be likely occur. Therefore, the number of the regions is desirably not less than four.

What is claimed is:

1. A torque sensor coil used to form a torque sensor that is attached around a magnetostrictive rotating shaft to measure torque applied to the rotating shaft, the torque sensor coil comprising:
a non-magnetic bobbin that is provided coaxially with and at a distance from the rotating shaft, is formed into a hollow cylindrical shape, and comprises a plurality of first inclined grooves and a plurality of second inclined grooves on an outer peripheral surface, the first inclined grooves being inclined at a predetermined angle relative to an axial direction and the second inclined grooves being inclined at the predetermined angle relative to the axial direction in a direction opposite to the first inclined grooves;
a first detection coil formed by winding an insulated wire around the bobbin along the first inclined grooves; and
a second detection coil formed by winding an insulated wire around the bobbin along the second inclined grooves,
wherein the bobbin is divided into a plurality of regions along a circumferential direction, side walls of the first and second inclined grooves in each region are all parallel to a mold draw direction set to be different for each region or are inclined with respect to a parallel direction in such a manner that the first and second inclined grooves are widened toward an outside in a radial direction.

2. The torque sensor coil according to claim 1,
wherein the bobbin comprises a plurality of first raised portions at both axial ends, each first raised portion is surrounded by the first inclined groove and the second inclined groove, constitutes an axial end face of the bobbin and comprises a wire locking groove on an axial end face, and the wire locking groove is formed along the circumferential direction of the bobbin, opens axially outward, is connected to the first and second inclined grooves at circumferential ends, houses the insulated wire between the first inclined grooves adjacent to each other or between the second inclined grooves adjacent to each other, and is provided to restrict the insulated wire from moving radially outward and thereby to prevent the insulated wire from slipping off of the bobbin.

3. The torque sensor coil according to claim 2, wherein the bobbin comprises a plurality of second raised portions each surrounded by two of the first inclined grooves adjacent to each other and two of the second inclined grooves adjacent to each other, and each of the second raised portions is configured that a distance between opposite side walls gradually increases toward the outside in the radial direction.

4. The torque sensor coil according to claim 3, wherein the second raised portions are arranged to overlap the first raised portions in the axial direction of the bobbin, and each of the second raised portions comprises secondary wire locking grooves each having a bottom wall at the same axial position as a bottom wall of the first raised portion and opening axially outward.

5. The torque sensor coil according to claim 3, wherein a plurality of inclined groove pairs are provided along the circumferential direction, each inclined groove pair comprising one of the first inclined grooves and one of the second inclined grooves that intersect each other, and the regions are provided so that one inclined groove pair is included in each region.

6. The torque sensor coil according to claim 3, wherein the mold draw direction is a radial direction at a circumferential center of a corresponding region.

7. A torque sensor, comprising the torque sensor coil according to claim 3.

8. The torque sensor coil according to claim 4, wherein a plurality of inclined groove pairs are provided along the circumferential direction, each inclined groove pair comprising one of the first inclined grooves and one of the second inclined grooves that intersect each other, and the regions are provided so that one inclined groove pair is included in each region.

9. The torque sensor coil according to claim 4, wherein the mold draw direction is a radial direction at a circumferential center of a corresponding region.

10. A torque sensor, comprising the torque sensor coil according to claim 4.

11. The torque sensor coil according to claim 4,
wherein the first raised portions are arranged at equal intervals in the circumferential direction of the bobbin so that the first raised portions provided at one axial end of the bobbin axially face the first raised portions provided at the other axial end, the second raised portions are arranged at equal intervals in the circumferential direction of the bobbin at positions between the first raised portions circumferentially adjacent to each other so as to overlap the first raised portions provided at the one and other axial ends, and each of the second raised portions comprises the secondary wire locking grooves at both ends in the axial direction.

12. The torque sensor coil according to claim 11, wherein a plurality of inclined groove pairs are provided along the circumferential direction, each inclined groove pair comprising one of the first inclined grooves and one of the second inclined grooves that intersect each other, and the regions are provided so that one inclined groove pair is included in each region.

13. The torque sensor coil according to claim 11, wherein the mold draw direction is a radial direction at a circumferential center of a corresponding region.

14. A torque sensor, comprising the torque sensor coil according to claim 11.

15. The torque sensor coil according to claim 2, wherein a plurality of inclined groove pairs are provided along the circumferential direction, each inclined groove pair comprising one of the first inclined grooves and one of the second inclined grooves that intersect each other, and the regions are provided so that one inclined groove pair is included in each region.

16. The torque sensor coil according to claim 2, wherein the mold draw direction is a radial direction at a circumferential center of a corresponding region.

17. A torque sensor, comprising the torque sensor coil according to claim 2.

18. The torque sensor coil according to claim 1, wherein a plurality of inclined groove pairs are provided along the circumferential direction, each inclined groove pair comprising one of the first inclined grooves and one of the second inclined grooves that intersect each other, and the regions are provided so that one inclined groove pair is included in each region.

19. The torque sensor coil according to claim 18, wherein the mold draw direction is a radial direction at a circumferential center of a corresponding region.

20. A torque sensor, comprising the torque sensor coil according to claim 18.

21. The torque sensor coil according to claim 1, wherein the mold draw direction is a radial direction at a circumferential center of a corresponding region.

22. A torque sensor, comprising the torque sensor coil according to claim 21.

23. A torque sensor, comprising the torque sensor coil according to claim 1.

* * * * *